R. G. BRINDLE.
PRODUCT FROM STEEP WATER AND METHOD OF MANUFACTURING THE SAME.
APPLICATION FILED OCT. 11, 1918.
1,313,163.
Patented Aug. 12, 1919.
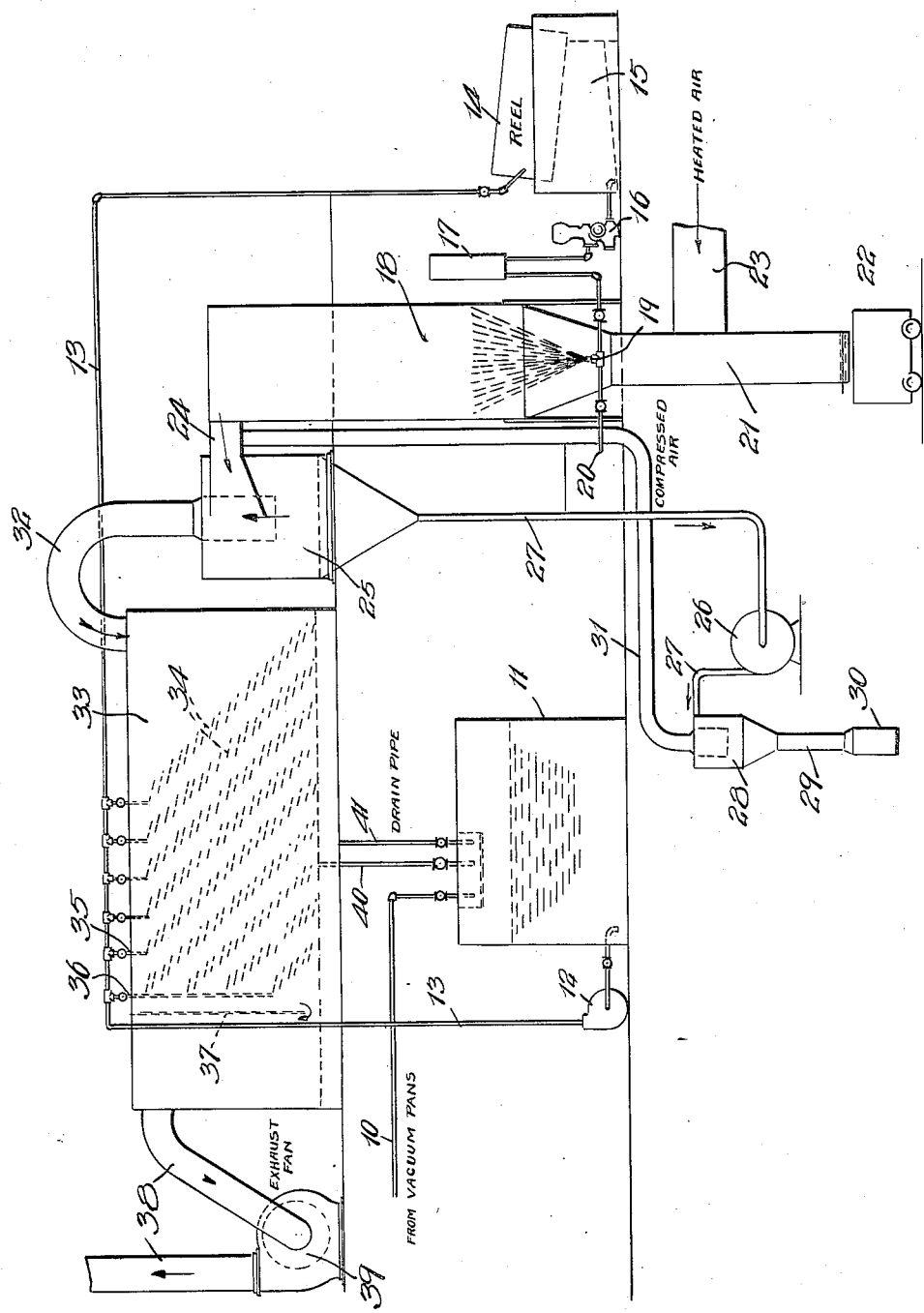
Witnesses:
W. T. Kilroy
Harry R. L. White
Inventor:
Richard G. Brindle
Barnett & Truman
Attys.
By

UNITED STATES PATENT OFFICE.

RICHARD GUY BRINDLE, OF CHICAGO, ILLINOIS, ASSIGNOR TO CORN PRODUCTS REFINING COMPANY, A CORPORATION OF NEW JERSEY.

PRODUCT FROM STEEP WATER AND METHOD OF MANUFACTURING THE SAME.

1,313,163.   Specification of Letters Patent.   Patented Aug. 12, 1919.

Application filed October 11, 1918. Serial No. 257,769.

*To all whom it may concern:*

Be it known that I, RICHARD G. BRINDLE, a citizen of the United States, residing at Chicago, in the county of Cook and State of Illinois, have invented certain new and useful Improvements in Products from Steep Water and Methods of Manufacturing the Same, of which the following is a specification.

My invention relates to the treatment of liquors containing soluble substances derived from Indian corn, and more especially to the treatment of "steep water" or the liquor which results from the steeping of the grain in the manufacture of corn starch and allied products.

A primary object of the invention is to improve upon the process disclosed in the application of Richard G. Brindle and Amos H. Flint for product usable as a fertilizer and method of manufacturing the same, filed July 3, 1918, Serial No. 243,247, so as to simplify the process and obtain a better and more desirable product, and particularly a product in which the sugar ingredient of the corn is caramelized or carbonized with the result that the material is non-hydroscopic.

According to the method described in the application above referred to, a product is obtained which contains a considerable quantity of sugar, analysis of a sample showing a sugar content of about thirty per cent. As a result the product will absorb moisture to a certain extent, making it somewhat difficult and inconvenient to handle, even when it is manufactured in the manner recommended for minimizing hydroscopicity in the application above referred to. The sugar ingredient of the product is also a detriment, in case the material is used as a fertilizer, as it produces a fermentation likely to injure plants, especially very young plants, unless the material is used with considerable care.

The improvement of my invention consists in subjecting the steep liquor to a drying operation which, besides evaporating the moisture so as to give a dry product, hydrolyzes or caramelizes or carbonizes the sugar. At the temperature employed the other ingredients of the steep liquor are not affected, at least, in any detrimental sense. Strictly speaking, the terms "hydrolyzing", "caramelizing" and "carbonizing" are synonymous, meaning the reduction of the sugar to carbon by the removal of the hydrogen and oxygen. In a more popular sense the term "caramelizing", as applied to sugar, means a partial elimination of the water from the sugar. In accordance with my process the hydrolysis is not necessarily complete. It should be sufficient, however, to prevent the material from being to any detrimental extent hygroscopic. In specifying in the claims the caramelization of the sugar I intend either a complete hydrolyzation or such approximation thereto as will give the desired result.

With the sugar caramelized as described, the product will absorb practically no moisture and will remain in a pulverulent state without caking even when open to the atmosphere or damp weather. In this condition the material may be used as a fertilizer without danger of deleterious fermentation. Moreover, the carbon resulting from the hydrolyzing of the sugar may be separated from the other ingredients of the product and put to beneficial uses.

In the operation of drying the steep liquor I preferably concentrate the liquor to approximately 30° Baumé and then complete the evaporation, and at the same time caramelize the sugar, by a method of spray desiccation. Any well known apparatus used for desiccating liquids may be employed provided it is capable of giving sufficiently high temperature at the point of evaporation. I prefer, however, to use an apparatus such as is illustrated in the accompanying drawing. This drawing shows the apparatus in side elevation and somewhat diagrammatically.

Referring to the drawing, the concentrated liquor from the vacuum pans is run through a pipe 10 into a tank 11 from which it is forced by pump 12 through a pipe 13 to a reel 14 arranged above the tank 15. From tank 15 it is forced by pump 16 through pressure chamber 17 into the evaporation chamber 18 into which it is sprayed by means of a spray nozzle 19 supplied with air under pressure from pipe 20. The bulk of the dried material is discharged through pipe 21 into a receptacle 22. The heated air is introduced into the bottom of the evaporation chamber through pipe 23. Under the conditions specified the air in pipe 23 should be heated to approximately 600° Fahrenheit. This will give a temperature at the place of evaporation of about 500° Fahrenheit which, approximately, is the temperature necessary to obtain the caramelization of the sugar. The temperature maintained at the place where drying occurs may be varied in accordance with the character of the product desired. In order that the other ingredients of the material should not be affected, particularly the protein matter, it should not be substantially above 700° Fahrenheit.

In view of the relatively high temperatures used it is desirable to economize fuel by saving as much of the heat from the evaporation chamber as is possible. This is accomplished, in the preferred form of the apparatus shown, together with the recovery of such fine particles as may be carried out of the evaporation chamber by the air current, by means of the following arrangements: The air passes out of the evaporation chamber by a pipe 24 which leads to a cyclone dust collector 25. The dry material from the dust collector is drawn by a suction and force pump 26 through a pipe 27 into another cyclone dust collector 28 having a discharge spout 29 for a sack or other receptacle 30. The air from the dust collector 28 passes through pipe 31 back to pipe 24 and dust collector 25. The air from dust collector 25 passes through a pipe 32 into a chamber 33 in which are arranged a plurality of obliquely disposed shelves 34 in staggered relation, over which flows liquor drawn from pipe 13 through spouts 35, 36. The air from pipe 32 passes through and across the divided streams of liquor flowing over shelves 34 and then through a space between the lower edge of a vertical partition 37 in the end of the chamber 33 and is drawn out of the chamber through pipe 38 by an exhaust fan 39. The liquor in the bottom of chamber 33 is returned to tank 11 by pipe 40. 41 is a pipe ordinarily closed for draining tank 33. By these arrangements a large portion of the heat escaping from the evaporation chamber is recovered as well as the solid particles in suspension in the air current, the latter adding to the density of the liquor treated in the evaporation chamber, thereby facilitating the operation of preliminary concentration in the vacuum pans.

The product is in the form of powder. Chemically it is composed of protein matter, phosphoric acid, potash and sugar more or less completely caramelized or reduced to carbon. At first the material will contain but a very small percentage of water. If exposed to the air it will absorb moisture to the extent of about twelve or thirteen per cent., but without becoming sticky or caking. After this the moisture content will remain substantially constant under ordinary atmospheric conditions. In the common sense of the term, the material is therefore not hygroscopic.

I claim:

1. A dry product composed of soluble substances from Indian corn, with the sugar ingredient caramelized.

2. Dried steep liquor from the starch industry having the sugar ingredient caramelized.

3. A dry product composed of the following constituents derived from Indian corn: protein matter, phosphoric acid, potash and caramelized sugar.

4. Improved method of manufacturing the product described which consists in steeping the corn, and evaporating the water from the steep liquor by a drying operation which caramelizes the sugar.

5. Improved method of manufacturing the product described which consists in steeping the corn and evaporating the water from the steep liquor by spray desiccation at a temperature which caramelizes the sugar.

6. Improved method of manufacturing the product described which consists in concentrating the steep liquor by evaporation of a portion of the moisture, then spraying the concentrated liquor in a current of air heated to a temperature which will caramelize the sugar.

7. Improved method of manufacturing the product described which comprises drying the liquor containing soluble substances from Indian corn at a temperature which will caramelize the sugar.

8. Improved method of manufacturing the product described which comprises drying the liquor containing soluble substances from Indian corn by spraying the same into an air current heated to give a temperature at the place of evaporation of substantially from 500° to 700° Fahrenheit.

9. Improved method of manufacturing the product described which consists in steeping corn, concentrating the steep liquor to a density of substantially 30° Baumé, and spraying the concentrated liquor into an air current which before contact with the liquor has a temperature of substantially 600° Fahrenheit, or higher.

RICHARD GUY BRINDLE.